US011056081B2

(12) United States Patent
Zhao et al.

(10) Patent No.: US 11,056,081 B2
(45) Date of Patent: Jul. 6, 2021

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Yong Zhao, Hubei (CN); Zuomin Liao, Hubei (CN); Tao Chen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/754,161

(22) PCT Filed: Nov. 6, 2019

(86) PCT No.: PCT/CN2019/115980

§ 371 (c)(1),
(2) Date: Apr. 7, 2020

(87) PCT Pub. No.: WO2021/027103

PCT Pub. Date: Feb. 18, 2021

(65) Prior Publication Data

US 2021/0043166 A1 Feb. 11, 2021

(51) Int. Cl.

*G09G 5/14* (2006.01)
*H04N 5/225* (2006.01)

(52) U.S. Cl.

CPC ............. *G09G 5/14* (2013.01); *H04N 5/2257* (2013.01); *G09G 2300/0452* (2013.01)

(58) Field of Classification Search

None

See application file for complete search history.

(56) References Cited

U.S. PATENT DOCUMENTS

| | | | | |
|---|---|---|---|---|
| 9,013,367 | B2 * | 4/2015 | Cope | H01L 33/48 345/1.3 |
| 9,219,087 | B2 * | 12/2015 | Jinta | H01L 27/1259 |
| 9,485,397 | B2 * | 11/2016 | Rudmann | H01L 27/14623 |
| 9,743,015 | B2 * | 8/2017 | Lee | H04N 5/2257 |
| 10,134,180 | B2 * | 11/2018 | Naske | H04N 13/398 |
| 10,147,351 | B2 * | 12/2018 | Yang | G09G 3/20 |
| 10,199,437 | B2 * | 2/2019 | Kim | H01L 27/3216 |
| 10,410,566 | B1 * | 9/2019 | Kerdemelidis | G02B 27/0081 |
| 10,462,433 | B2 * | 10/2019 | Chen | H04N 9/04555 |
| 10,848,752 | B2 * | 11/2020 | Kim | G09G 3/003 |
| 10,917,549 | B2 * | 2/2021 | Jia | H04N 5/2257 |

(Continued)

*Primary Examiner* — Vinh T Lam

(74) *Attorney, Agent, or Firm* — Mark M. Friedman

(57) ABSTRACT

A display panel and a display device are provided. The display panel includes at least one first display area, and a second display area located at a periphery of the first display area. The first display area includes a plurality of first repeating sub-areas that can be repeatedly arranged in both a first direction and a second direction. The second display area includes a plurality of second repeating sub-areas that has a same size as the first repeating sub-areas. A number of the pixels disposed within the first repeating sub-areas is less than a number of the pixels disposed within the second repeating sub-areas.

20 Claims, 12 Drawing Sheets

(56) References Cited

U.S. PATENT DOCUMENTS

| | | | | |
|---|---|---|---|---|
| 2013/0187910 | A1* | 7/2013 | Raymond | H04N 13/305 345/419 |
| 2013/0249976 | A1* | 9/2013 | Kunieda | G09G 5/14 345/698 |
| 2014/0009463 | A1* | 1/2014 | Watanabe | H04N 13/317 345/419 |
| 2015/0077575 | A1* | 3/2015 | Krig | H04N 13/239 348/207.11 |
| 2016/0225805 | A1* | 8/2016 | Keelan | H04N 9/04557 |
| 2017/0064173 | A1* | 3/2017 | Yoo | H04N 5/2351 |
| 2017/0214003 | A1* | 7/2017 | Lee | H01L 51/5271 |
| 2017/0236464 | A1* | 8/2017 | Koshihara | G09G 3/2003 345/694 |
| 2017/0310956 | A1* | 10/2017 | Perdices-Gonzalez | H04N 13/366 |
| 2018/0090063 | A1* | 3/2018 | Ying | G09G 3/3225 |
| 2018/0130401 | A1* | 5/2018 | Xiang | G09G 3/3406 |
| 2018/0158882 | A1* | 6/2018 | Kim | H01L 27/3248 |
| 2018/0357952 | A1* | 12/2018 | Yang | H04N 5/232 |
| 2019/0027080 | A1* | 1/2019 | Johnson | G09G 3/2003 |
| 2019/0035861 | A1* | 1/2019 | Wang | H01L 27/32 |
| 2019/0043407 | A1* | 2/2019 | Yang | G09G 3/3208 |
| 2019/0043408 | A1* | 2/2019 | Li | G09G 3/2003 |
| 2019/0051670 | A1* | 2/2019 | Bei | H01L 27/3276 |
| 2019/0123066 | A1* | 4/2019 | Zhan | H01L 27/1218 |
| 2019/0164477 | A1* | 5/2019 | Yim | G09G 3/3225 |
| 2019/0164502 | A1* | 5/2019 | Yoon | G09G 3/3233 |
| 2019/0172895 | A1* | 6/2019 | Liu | H01L 27/3211 |
| 2019/0236997 | A1* | 8/2019 | Han | G09G 3/2018 |
| 2019/0251895 | A1* | 8/2019 | Zhang | H01L 27/3218 |
| 2019/0252469 | A1* | 8/2019 | Xiao | H01L 27/3216 |
| 2019/0304378 | A1* | 10/2019 | Cho | G09G 3/3233 |
| 2019/0304387 | A1* | 10/2019 | Tomizawa | G09G 3/3607 |
| 2019/0305004 | A1* | 10/2019 | Li | G09F 9/30 |
| 2019/0311683 | A1* | 10/2019 | Park | G09G 3/2003 |
| 2019/0340970 | A1* | 11/2019 | Kirisken | G09G 3/20 |
| 2019/0371232 | A1* | 12/2019 | Kim | G09G 3/32 |
| 2019/0371235 | A1* | 12/2019 | Lee | G09G 3/006 |
| 2019/0371269 | A1* | 12/2019 | Matsueda | G09G 3/2003 |
| 2020/0111403 | A1* | 4/2020 | Kim | G09G 3/2011 |
| 2020/0111404 | A1* | 4/2020 | Kim | G09G 3/2003 |
| 2020/0144338 | A1* | 5/2020 | Zhou | H01L 27/3218 |
| 2020/0174278 | A1* | 6/2020 | Zhu | G02B 27/0018 |
| 2020/0195764 | A1* | 6/2020 | Xu | H04N 5/2258 |
| 2020/0236259 | A1* | 7/2020 | Nakamura | H01L 51/5253 |
| 2020/0389576 | A1* | 12/2020 | Newman | H04N 5/217 |
| 2021/0019540 | A1* | 1/2021 | Nilsson | H04N 5/2257 |

* cited by examiner

| R | | B | | R | | B | | R | | B | |
|---|---|---|---|---|---|---|---|---|---|---|---|
| | G | | G | | G | | G | | G | | G |
| B | | R | | B | | R | | B | | R | |
| | G | | G | | G | | G | | G | | G |
| R | | B | | R | | B | | R | | B | |
| | G | | G | | G | | G | | G | | G |
| B | | R | | B | | R | | B | | R | |
| | G | | G | | G | | G | | G | | G |
| R | | B | | R | | B | | R | | B | |
| | G | | G | | G | | G | | G | | G |
| B | | R | | B | | R | | B | | R | |
| | G | | G | | G | | G | | G | | G |

FIG. 2

| R | G | B | R | G | B | R | G | B | R | G | B |
|---|---|---|---|---|---|---|---|---|---|---|---|
| R | G | B | R | G | B | R | G | B | R | G | B |
| R | G | B | R | G | B | R | G | B | R | G | B |
| R | G | B | R | G | B | R | G | B | R | G | B |
| R | G | B | R | G | B | R | G | B | R | G | B |
| R | G | B | R | G | B | R | G | B | R | G | B |

FIG. 3

DISPLAY PANEL AND DISPLAY DEVICE

FIELD OF INVENTION

The present application relates to the field of display technologies, and more particularly to a display panel and a display device.

BACKGROUND OF INVENTION

With development of technology and increase of people's requirements for products, full display products with a high screen-to-body ratio have become expected development trends of smartphones.

The presence of front cameras greatly reduces screen-to-body ratios of products. Present under-screen camera technology usually needs to perform hole-making processes on display panels in order to leave transparent areas, for light to pass through. However, the display panels cannot display images in the transparent area, which reduces screen-to-body ratios of display devices and does not enable full-view display.

In regard to this technical problem, the present disclosure provides the following technical solutions.

SUMMARY OF INVENTION

The present application provides a display panel to solve the problem that existing screens of display devices unable to achieve full-view display.

To solve the above problems, the technical solution provided by the present disclosure is as follows:

The present disclosure provides a display panel, comprising: at least one first display area, and a second display area positioned at a periphery of the first display area;

wherein the first display area comprises a plurality of first repeating sub-areas repeatedly arranged in a first direction and a second direction, a difference between a size of the first repeating sub-areas in the first direction and a size of the first repeating sub-areas in the second direction is less than or equal to a size of one pixel, and the first direction is different from the second direction;

wherein the second display area comprises a plurality of second repeating sub-areas that has a same size as the first repeating sub-areas; and wherein a number of the pixels disposed within the first repeating sub-areas is less than a number of the pixels disposed within the second repeating sub-areas.

The display panel according to the present disclosure, wherein each of the first repeating sub-areas is provided with at least one first pixel cluster or one sub-pixel;

wherein the first pixel cluster comprises a plurality of the sub-pixels arranged in a predetermined arrangement order; and wherein the sub-pixels comprise any one of R, G, and B.

The display panel according to the present disclosure, wherein the first pixel cluster comprises any one of RGBG, RGBGBGRG, RGB, and BGR.

The display panel according to the present disclosure, wherein the first pixel cluster comprises a plurality of first sub-pixel clusters arranged in the first direction and/or the second direction; and wherein the first sub-pixel clusters each comprises at least one of R, G, and B.

The display panel according to the present disclosure, wherein two of the adjacent first sub-pixel clusters are disposed in close proximity in the first direction and/or the second direction; or a distance between the two adjacent first sub-pixel clusters in the first direction and/or between the two adjacent first sub-pixel clusters in the second direction is equal to a size of at least one of the sub-pixels in the first direction or the second direction.

The display panel according to the present disclosure, wherein each of the first repeat sub-areas is provided with five of the first pixel clusters;

wherein a distance between the two adjacent first pixel clusters in the first direction is a size of four of the sub-pixels in the first direction; and a distance between the two adjacent first pixel clusters in the second direction is a size of four of the sub-pixels in the second direction; and wherein the first pixel cluster comprises four of the first sub-pixel clusters, and the first sub-pixel cluster is composed of one red sub-pixel and one green sub-pixel, or composed of one blue sub-pixel and one green sub-pixel.

The display panel according to the present disclosure, wherein each of the first repeating sub-areas is provided with two of the first pixel clusters;

wherein any one of the first pixel clusters comprises two of the first sub-pixel clusters arranged along the first direction or the second direction; and wherein one of the first sub-pixel clusters is composed of one red sub-pixel and one green sub-pixel, and the another first sub-pixel cluster is composed of one blue sub-pixel and one green sub-pixel.

The display panel according to the present disclosure, wherein each of the first repeating sub-areas is provided with two of the first pixel clusters;

wherein any one of the first pixel clusters comprises four of the first sub-pixel clusters;

wherein one of the first sub-pixel cluster is composed of one red sub-pixel, the another first sub-pixel cluster is composed of one blue sub-pixel, and the other two of the first sub-pixel clusters are composed of one green sub-pixel; and wherein a distance between the two adjacent first sub-pixel clusters within the first pixel cluster in the first direction is equal to a size of one of the sub-pixels in the first direction.

The display panel according to the present disclosure, wherein each of the first repeating sub-areas is provided with one of the first pixel cluster;

wherein the first pixel clusters each comprises one of the first sub-pixel cluster;

wherein the first sub-pixel cluster is composed of one red sub-pixel, one blue sub-pixel, and one green sub-pixel; and wherein a distance between two adjacent first pixel clusters is equal to a size of one of the sub-pixels in the first direction.

The display panel according to the present disclosure, wherein each of the first repeat sub-areas is provided with six of the first pixel clusters;

wherein the two adjacent first pixel clusters are disposed in close proximity in the first direction;

wherein a distance between two adjacent first pixel clusters in the second direction is a size of one of the sub-pixels in the second direction;

wherein the first pixel cluster comprises two of the first sub-pixel clusters;

wherein any one of the first sub-pixel clusters is composed of one red sub-pixel, one green sub-pixel, and one blue sub-pixel; and wherein the first sub-pixel clusters are arranged in an order of red sub-pixels, green sub-pixels, and blue sub-pixels in the first direction.

The display panel according to the present disclosure, wherein a pixel arrangement type of the first display area is same as a pixel arrangement type of the second display area.

The display panel according to the present disclosure, wherein a ratio of the number of the pixels of the first repeating sub-areas to the number of the pixels of the second repeating sub-areas is any one of 1/2, 1/4, and 1/9.

The display panel according to the present disclosure, wherein a pixel arrangement type of the first display area is different from a pixel arrangement type of the second display area.

The display panel according to the present disclosure, wherein a ratio of the number of pixels of the first repeating sub-areas to the number of the pixels of the second repeating sub-areas is any one of 1.5/4 and 1.5/9.

The present disclosure further provides a display device, comprising: a display panel, a housing, and a camera module disposed between the display panel and the housing;

wherein the display panel comprises at least one first display area, and a second display area positioned at a periphery of the first display area;

wherein the first display area comprises a plurality of first repeating sub-areas repeatedly arranged in a first direction and a second direction, a difference between a size of the first repeating sub-areas in the first direction and a size of the first repeating sub-areas in the second direction is less than or equal to a size of one pixel, and the first direction is different from the second direction;

wherein the second display area comprises a plurality of second repeating sub-areas that has a same size as the first repeating sub-areas; and wherein a number of the pixels disposed within the first repeating sub-areas is less than a number of the pixels disposed within the second repeating sub-areas.

The display panel according to the present disclosure, wherein each of the first repeating sub-areas is provided with at least one first pixel cluster or one sub-pixel;

wherein the first pixel cluster comprises a plurality of the sub-pixels arranged in a predetermined arrangement order; and wherein the sub-pixel comprises any one of R, G, and B.

The display panel according to the present disclosure, wherein the first pixel cluster comprises any one of RGBG, RGBGBGRG, RGB, BGR; or wherein the first pixel cluster comprises a plurality of first sub-pixel clusters arranged in the first direction and/or the second direction;

wherein the first sub-pixel cluster each comprises at least one of R, G, and B.

The display panel according to the present disclosure, wherein the camera module comprises at least one light-receiving device; and wherein one of the light-receiving devices corresponds to one of the first display areas.

The display panel according to the present disclosure, wherein the light-receiving device further comprises at least one light-receiving unit; and wherein one of the light-receiving unit corresponds to a light-transmissive area that is surrounded by at least two of the adjacent first pixel clusters or the first sub-pixel clusters.

The display panel according to the present disclosure, wherein the camera module further comprises a switchable plate on the light-receiving device;

wherein a surface of the switchable plate adjacent to the display panel is composed of a reflective material;

wherein when the camera module receives the imaging signal sent by the display device, the switchable plate is opened, the first display area is in a non-display state, and the first display area permits an ambient light to incident on the camera module from the first display area; and wherein when the camera module receives a display signal from the display device, the switchable plate is closed, the first display area is in a display state, and the switchable plate reflects the light emitted by the first display area to external.

Beneficial effects: the present disclosure redesigns pixel arrangement within under-screen light-transmissive area. While ensuring the area to display properly, external light can enter the camera module through the area to enable imaging function, thereby increasing screen-to-body ratio of products and user experiences.

DESCRIPTION OF DRAWINGS

In order to illustrate technical solutions in the embodiments or in the prior art more clearly, the accompanying drawings required in the description of the embodiments or the prior art are introduced briefly hereafter. It is obvious that the accompanying drawings in the following description are merely part of the embodiments of the present disclosure. People with ordinary skills in the art can obtain other drawings without making inventive efforts.

FIG. 2 is a structural view of a first pixel of a second display area of the display panel of the present disclosure.

FIG. 3 is a structural view of a second pixel of the second display area of the display panel of the present disclosure.

DETAILED DESCRIPTION OF PREFERRED EMBODIMENTS

In the following detailed description, reference is made to the accompanying figures, in which various examples are shown by way of illustration. In this regard, directional terminology mentioned in the present disclosure, such as "top", "bottom", "front", "back", "left", "right", "inner", "outer", "lateral", etc., is used with reference to the orientation of the figures being described. Therefore, the directional terminology is used for purposes of illustration and is not intended to limit the present invention. In the accompanying figures, units with similar structures are indicated by the same reference numbers.

Screen-to-body ratios of products in existing electronic devices are greatly reduced because of the presence of front cameras. Existing under-screen camera technology usually needs to perform hole-making processes on the display panels in order to leave transparent areas for light to pass through. However, the display panels cannot display images in the transparent area, which reduces screen-to-body ratios of display devices and unable to perform full-view display. In regard to this technical problem, the present disclosure provides the following technical solutions.

Figure 1:
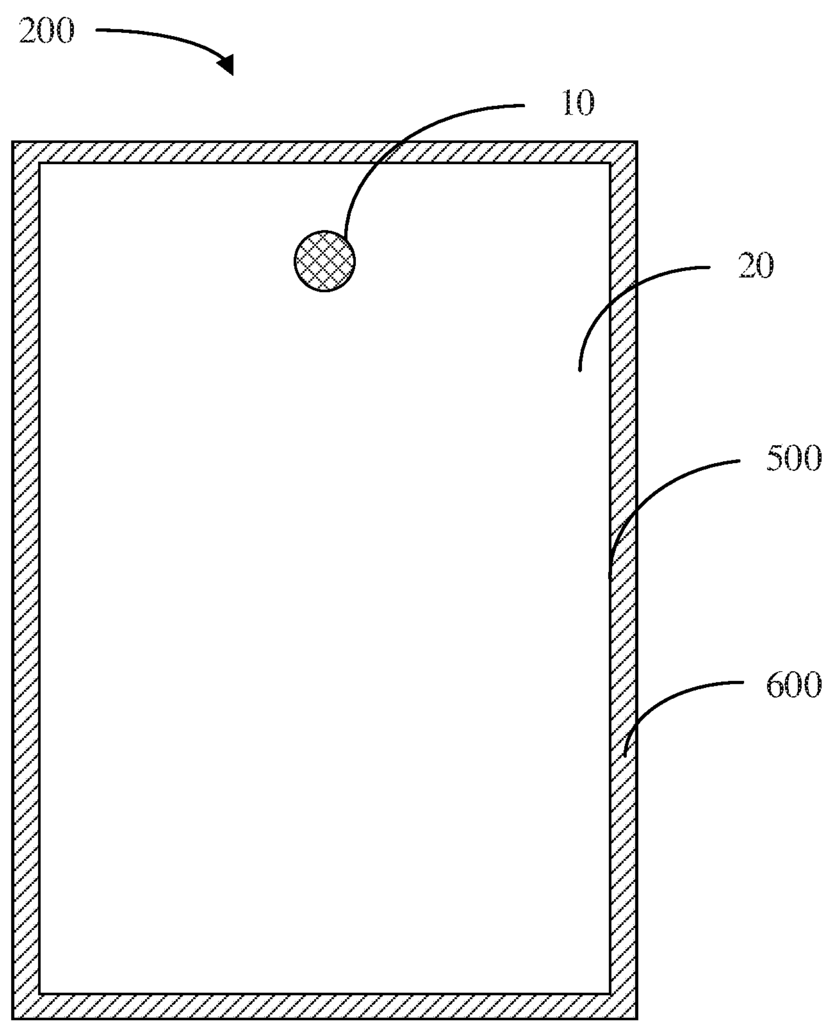
FIG. 1 is a structural top view of a display panel of the present disclosure.

Please refer to FIG. 1. The display panel 200 includes a display area 500 and a non-display area 600. The non-display area 600 is positioned at a periphery of the display area 500. The display area 500 includes at least one first display area 10, and a second display area 20 is positioned at a periphery of the first display area 10.

The first display area 10 includes a plurality of first repeating sub-areas 12 repeatedly arranged in a first direction and a second direction. A difference between a size of the first repeating sub-areas in the first direction and a size of the first repeating sub-areas in the second direction is less than or equal to a size of one pixel. It should be noted that the first direction can be X-axis direction in FIG. 1 and the second direction can be Y-axis direction in FIG. 1. Understandably, the first direction and the second direction are not limited to a set of mutually perpendicular axes, for example, X-axis and Y-axis. The first direction and the second direction can also be axes having other included angles, for example, 60 degrees.

The second display area 20 includes a plurality of second repeating sub-areas (not shown) that has a same size as the first repeating sub-areas 12.

In the present embodiment, a number of the pixels disposed within the first repeating sub-areas 12 is less than a number of the pixels disposed within the second repeating sub-areas.

In the present embodiment, the first display area 10 is a display light-transmissive area. The first display area 10 can transmit light to meet lighting requirements of photosensitive devices, such as cameras, and can also perform normal image display. The second display area 20 is a normal display area which can perform normal image display.

The present disclosure reduces a number of pixels within the first repeating sub-area 12 in the first display area 10, so that sufficient light-transmissive areas are left between two of the adjacent first pixel clusters 11. Light passes through the transmissive area to enter the camera module and is absorbed by the light-receiving device in the camera module to enable imaging function. While ensuring the area 10 to display properly, the display panel 200 of the present disclosure achieves the imaging function, thereby increasing screen-to-body ratio of products and user experiences.

Please refer to FIGS. 2-12, each of the first repeating sub-areas 12 is provided with at least one first pixel cluster 11 or one sub-pixel.

The first pixel cluster 11 can include any one of RGBG, RGBGBGRG, RGB, and BGR. The sub-pixels can include any of R, G, B.

Please refer to FIGS. 2-12, the first pixel cluster 11 includes at least one first sub-pixel cluster 111 arranged in the first direction X and/or the second direction Y.

The first sub-pixel cluster 111 includes at least one of R, G, and B.

Please refer to FIGS. 2-12, the two adjacent first sub-pixel clusters 111 are disposed in close proximity in the first direction X and/or the second direction Y.

Please refer to FIGS. 2-12, a distance between the two adjacent first sub-pixel clusters 111 in the first direction X and/or between the two adjacent first sub-pixel clusters in the second direction Y is equal to a size of at least one of the sub-pixels in the first direction X or the second direction Y.

Please refer to FIGS. 2-12, a ratio of the number of the pixels of the first repeating sub-areas to the number of the pixels of the second repeating sub-areas is any one of 1/2, 1/4, 1/9, 1.5/4, and 1.5/9.

Please refer to FIGS. 2-12, a pixel arrangement type of the first display area can be same as or different from a pixel arrangement type of the second display area. The pixel arrangement type of the first display area 10 is one of the first type and the second type that are different from each other. The pixel arrangement type of the second display area 20 is the one or another one of the first type and the second type that is different from each other.

The first type may be a red sub-pixel, a green sub-pixel, and a blue sub-pixel that are distributed in a one-dimensional array, such as standard RGB arrangement shown in FIG. 3. The second type may be a type in which adjacent pixels are shared with each other, such as pentile arrangement shown in FIG. 2. The first type and the second type of the present disclosure are not limited to the above-described two arrangements.

In the present embodiment, the pixel arrangement type of the first display area 10 and the second display area 20 may be one of a standard RGB arrangement or a pentile arrangement, which is not specifically limited thereto in the present disclosure. The standard RBG arrangement is real RBG, i.e., each pixel includes three sub-pixels—red, green and blue. Each pixel point of a pentile in the pantile arrangement "borrows" another color of an adjacent pixel to form three primary colors.

Technical solutions of the present disclosure will be described in conjunction with specific embodiments.

A type of the pixel arrangement of the second display area 20 is not specifically limited in the present disclosure. Please refer to FIGS. 2-3. FIG. 2 is a structural view of pixels of the second display area 20 to the display panel 200 in which the pixels are arranged in a form of standard RGB arrangement. FIG. 3 is a structural view of pixels of the second display area 20 to the display panel 200 in which the pixels are arranged in a form of the pentile arrangement.

In the following embodiments, the present disclosure is described using the pentile arrangement as an example of the pixel arrangement type of the first display area 10.

Figure 4:
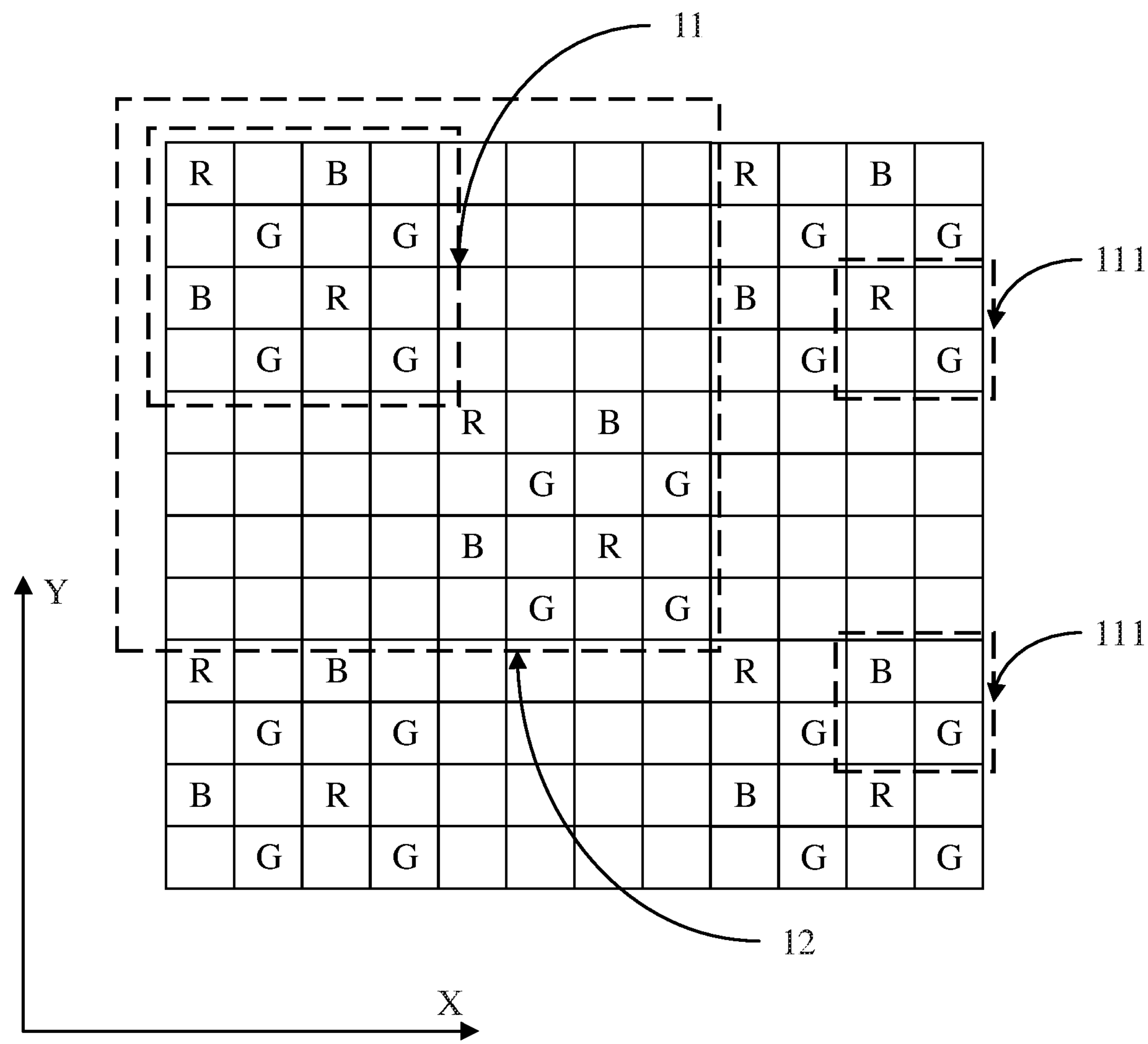
FIG. 4 is a structural view of a first pixel of a first display area of the display panel of the present disclosure.

Please refer to FIG. 4, in a 12×12 pixel section, pixel structures of the first repeating sub-area 12 of the figure are repeatedly arranged in the first direction X and/or the second direction Y in the present embodiment.

The pixel section shown in FIG. 4 is provided with five of the first pixel clusters 11. The first pixel clusters 11 are arranged in the first direction X and the second direction Y.

A distance between the two adjacent first pixel clusters 11 in the first direction X is a size of four sub-pixels in the first direction X.

A distance between the two adjacent first pixel clusters 11 in the second direction Y is a size of four sub-pixels in the second direction Y.

In the present embodiment, the first pixel cluster 11 includes four of the first sub-pixel clusters 111. The first sub-pixel clusters 111 are arranged along the first direction X and/or the second direction Y.

The first sub-pixel cluster 111 can be composed of one red sub-pixel and one green sub-pixel, or composed of one blue sub-pixel and one green sub-pixel. In the present embodiment, the red and green sub-pixels, and the blue and green sub-pixels are each arranged as a first sub-pixel cluster 111 in the first direction X and/or the second direction Y.

Compared with the second display area 20, the first repeating sub-area 12 of FIG. 4 are provided with two of the first pixel clusters 11, which is reduced by ½. An area of the light-transmissive area is ½ of the area of the first display area 10. External light enters the display panel 200 through an area where no sub-pixels are disposed. The external light is received by the corresponding camera module to achieve the imaging function.

Figure 5:
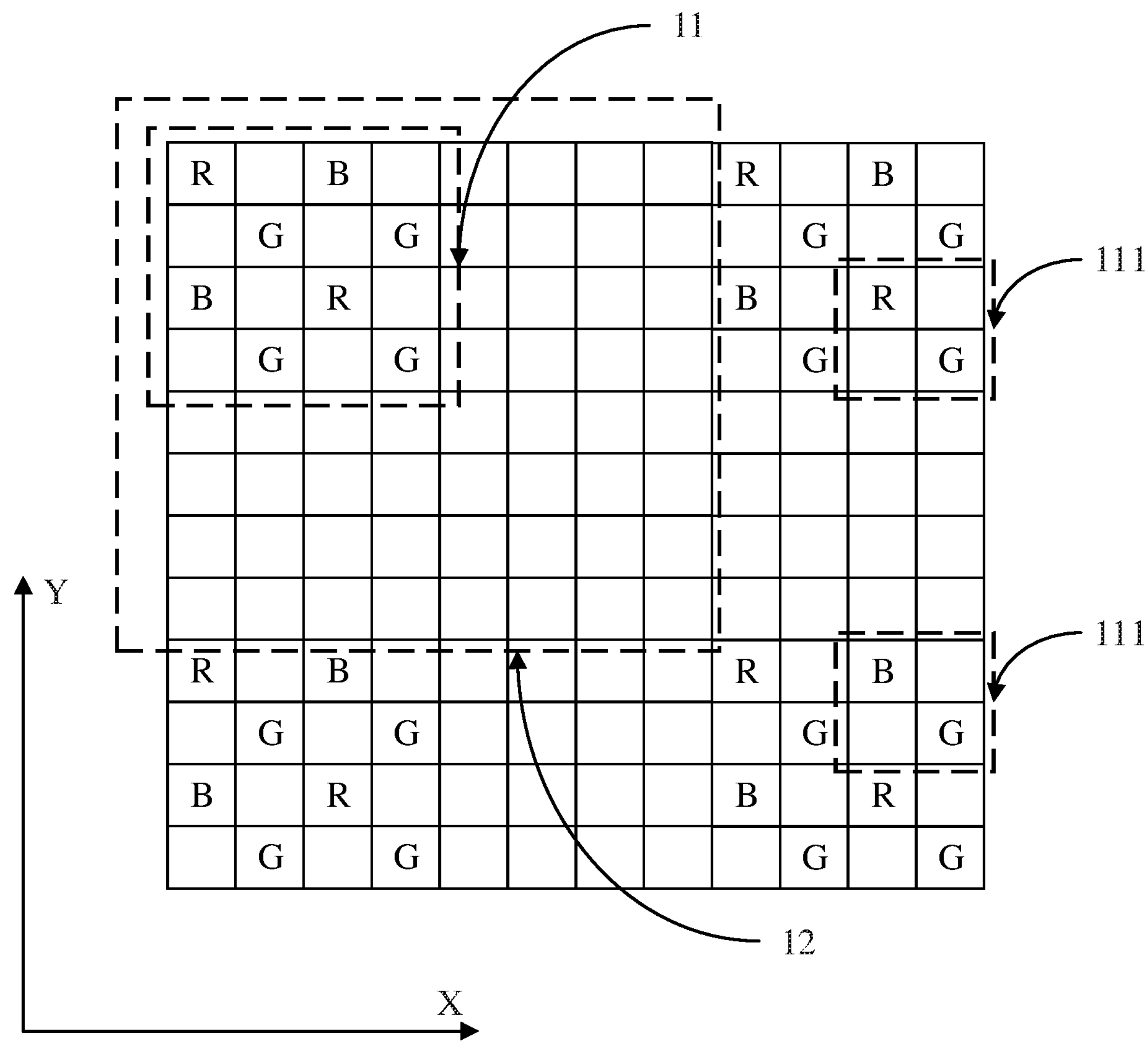
FIG. 5 is a structural view of a second pixel of the first display area of the display panel of the present disclosure.

Please refer to FIG. 5, the structure of the first pixel cluster 11 is same as the structure of the first sub-pixel of FIG. 4, except that:

compared with the second display area 20, the first repeating sub-area 12 of FIG. 5 is provided with one of the first pixel cluster 11, which is reduced by ¾. An area of the light-transmissive area is ¼ of an area of the first display area 10. External light enters the display panel 200 through an area where no sub-pixels are disposed, and the external light is received by the corresponding camera module to achieve the imaging function.

Figure 6:
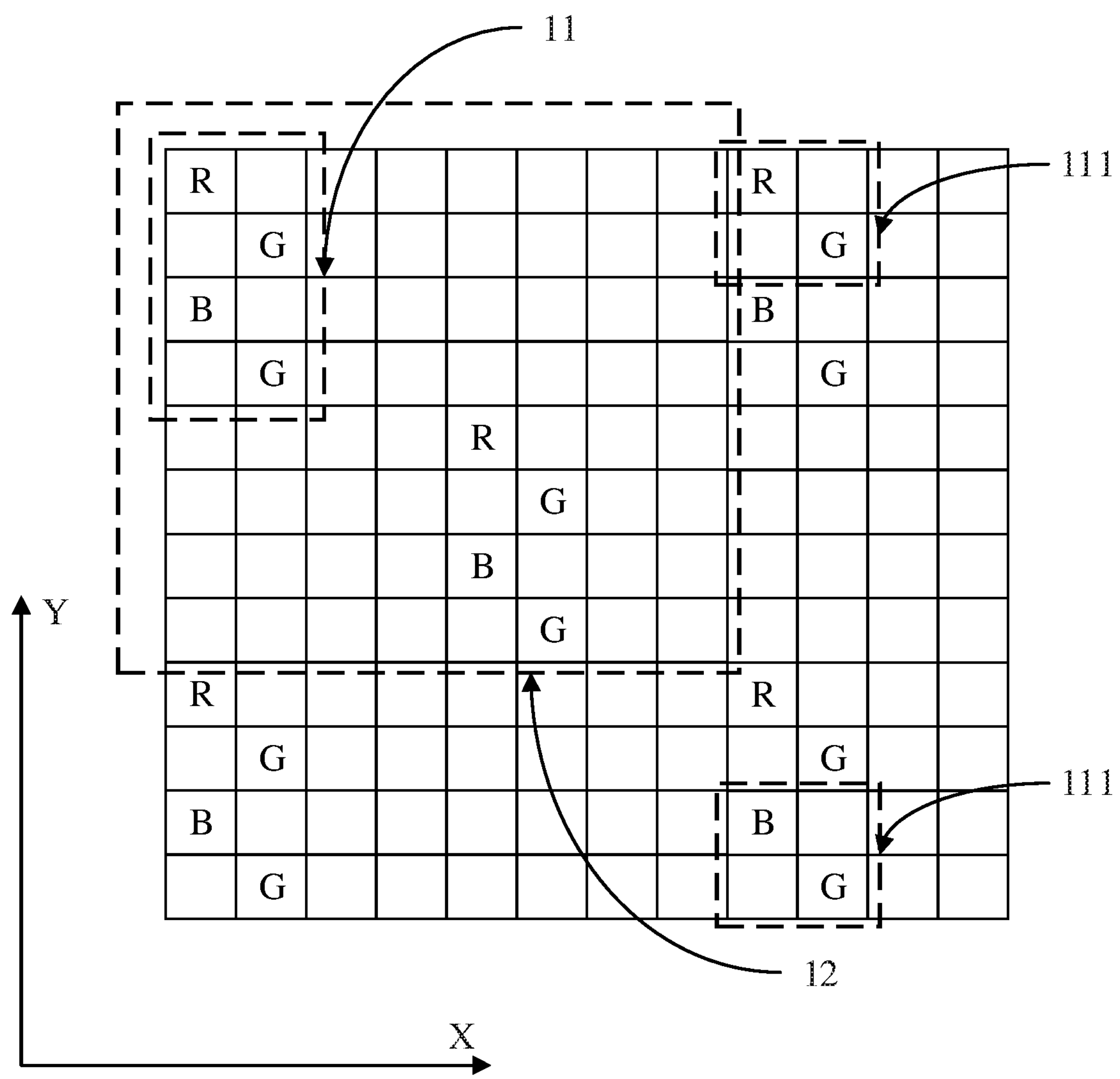
FIG. 6 is a structural view of a third pixel of the first display area of the display panel of the present disclosure.

Please refer to FIG. 6, the structure of the first pixel cluster 11 is different from the structures of the first pixel clusters 11 of FIG. 4 and FIG. 5.

The first repeating sub-area 12 is provided with two of the first pixel clusters 11. Any one of the first pixel clusters 11 includes the first sub-pixel clusters 111 that is arranged in the second direction Y. One of the first sub-pixel clusters 111 is composed of one red sub-pixel and one green sub-pixel. The another first sub-pixel cluster 111 is composed of one blue sub-pixel and one green sub-pixel.

Compared with the second display area 20, the first repeating sub-area 12 of FIG. 5 is provided with one of the first pixel cluster 11, which is reduced by ¾. An area of the light-transmissive area is ¼ of an area of the first display area 10.

Figure 7:
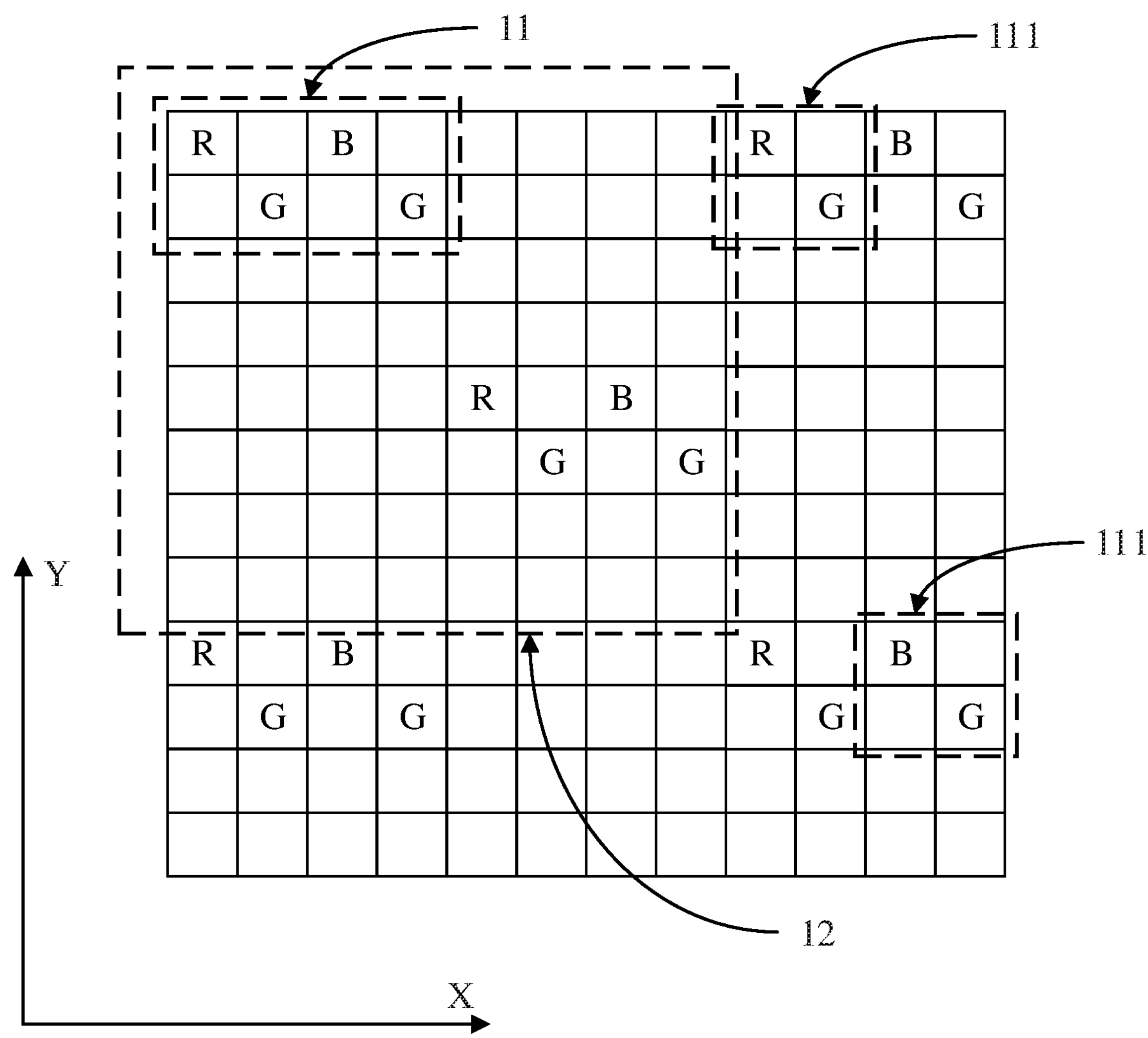
FIG. 7 is a structural view of a fourth pixel of the first display area of the display panel of the present disclosure.

Please refer to FIG. 7, the present embodiment is same as or similar to FIG. 6, except that:

the first repeating sub-area 12 is provided with two first pixel clusters 11. Any one of the first pixel clusters 11 includes the first sub-pixel clusters 111 arranged in a first direction X. Structures of the first sub-pixel clusters 111 are same as the structures of the first sub-pixel clusters 111 of FIG. 6, and details are not repeated herein.

In FIGS. 4-7, the two adjacent first sub-pixel clusters 111 are disposed immediately adjacent to the first direction X and/or the second direction Y.

Figure 8:
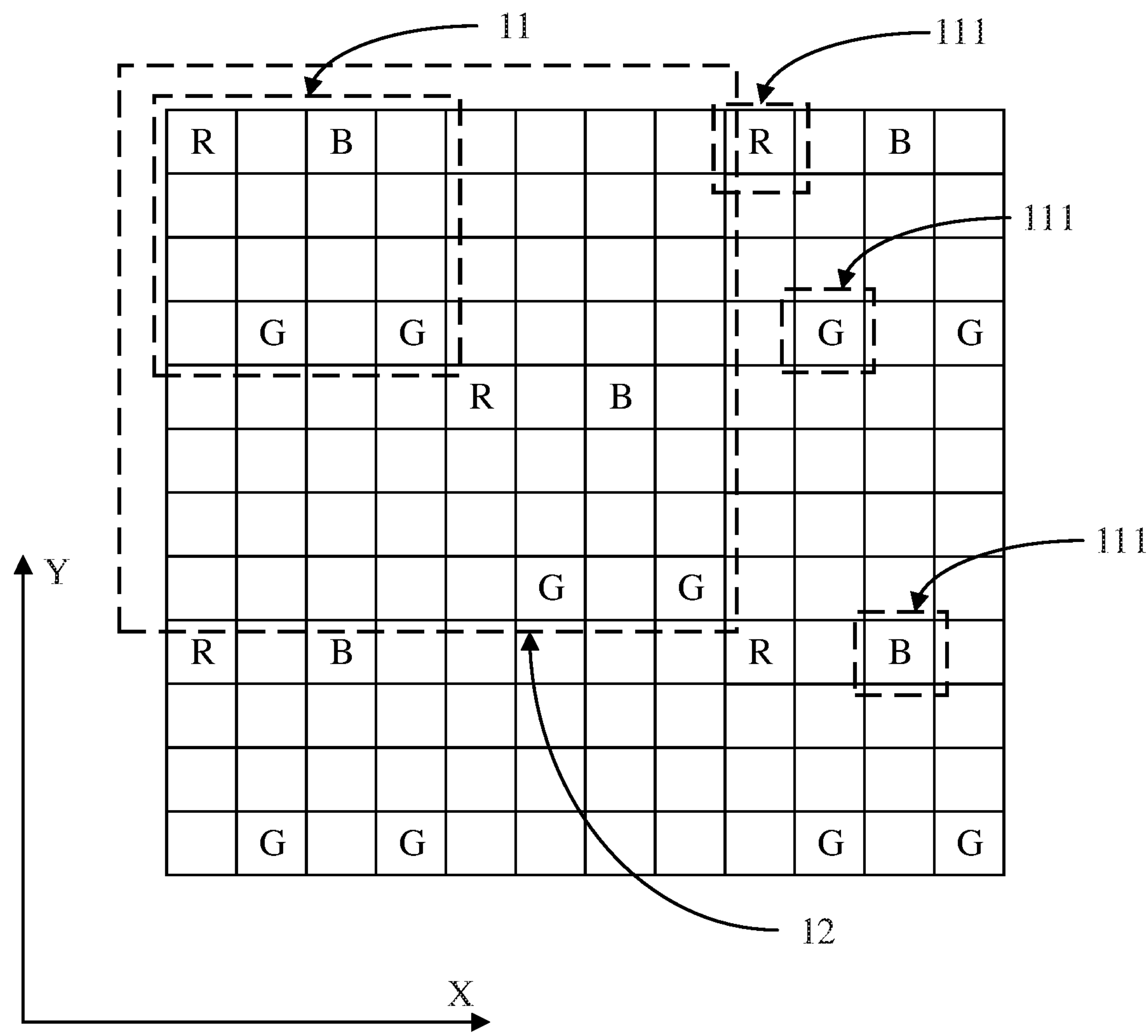
FIG. 8 is a structural view of a fifth pixel of the first display area of the display panel of the present disclosure.

Please refer to FIG. 8, the present embodiment is same as or similar to FIG. 7, except that:

the first repeating sub-area 12 are provided with two of the first pixel clusters 11. Any one of the first pixel clusters 11 includes four of the first sub-pixel clusters 111.

In the present embodiment, one of the first sub-pixel clusters 111 is composed of one red sub-pixel, the another first sub-pixel cluster 111 is composed of one blue sub-pixel, and the other two of the first sub-pixel clusters 111 are composed of one green sub-pixel.

In the present embodiment, a distance between the two adjacent first pixel clusters 111 in the first direction X is a size of one of the sub-pixels in the first direction X.

Compared with the second display area 20, the first repeating sub-area 12 in FIG. 5 is provided with one of the first pixel cluster 11, which is reduced by ¾, and an area of the light-transmissive area is ¼ of an area of the first display area 10.

On the basis of FIGS. 4-8, the sub-pixels of the first repeating sub-area 12 can be reduced to ⅙, ⅛, 1/9, etc. Details of specific embodiments are not repeated herein.

In FIGS. 4-8, for convenience of preparing the drawings, the areas of the red sub-pixels and the blue sub-pixels are equal to the areas of the green sub-pixels in the schematic views of the present disclosure, which is not intended to limit the embodiments.

Figure 9:
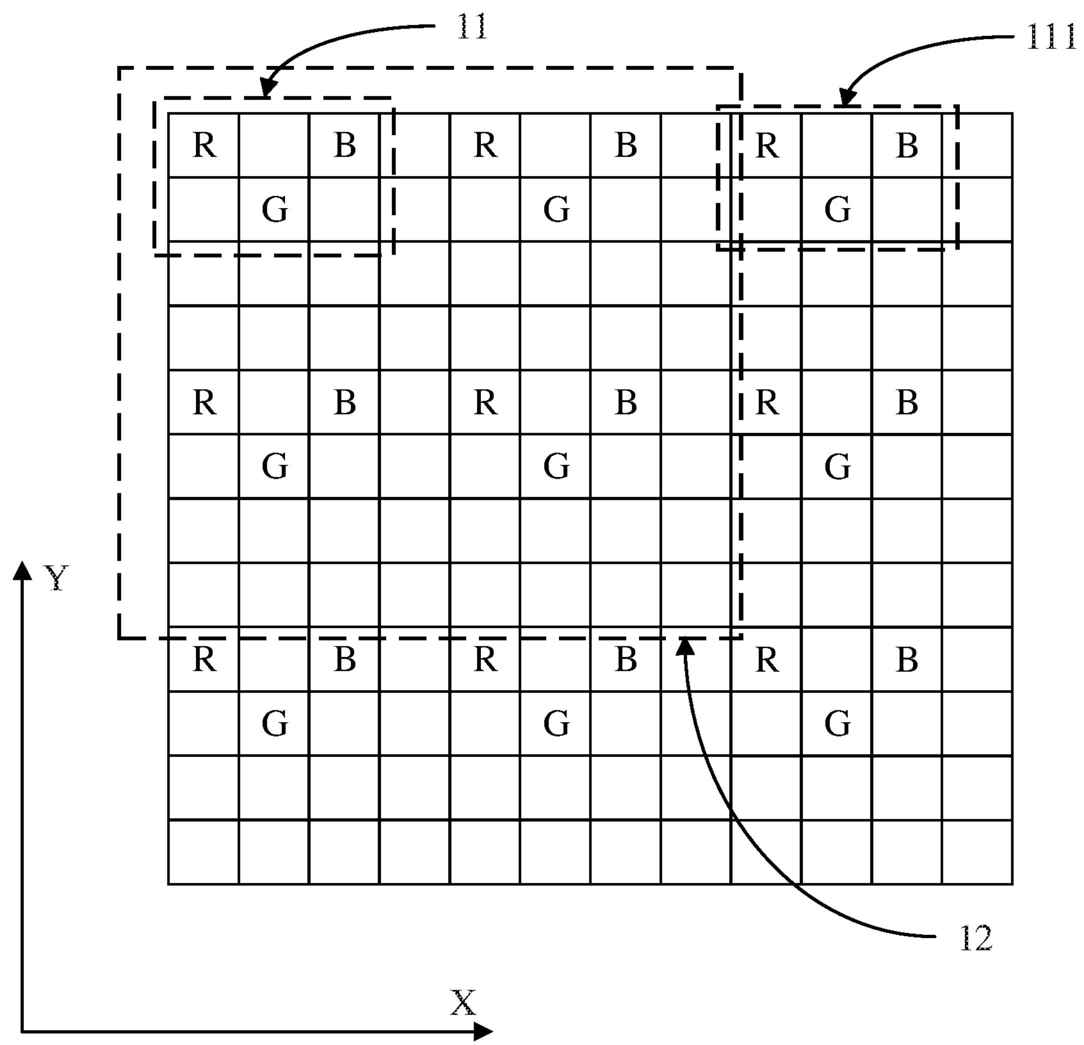
FIG. 9 is a structural view of a sixth pixel of the first display area of the display panel of the present disclosure.

Please refer to FIG. 9, the present embodiment is similar to FIG. 6 and FIG. 7, except that:

the first repeating sub-area 12 is provided with one of the first pixel cluster 11. The first pixel cluster 11 includes one of the first sub-pixel clusters 111. The first sub-pixel cluster 111 is composed of one red sub-pixel, one blue sub-pixel, and one green sub-pixel.

In the present embodiment, the sub-pixels of the first pixel cluster 11 are arranged along the first direction X.

A distance of the two adjacent first pixel clusters 11 can be equal to a size of one of the sub-pixels in the first direction X.

Compared with the second display area 20, the first repeating sub-area 12 of FIG. 5 is provided with one of the first pixel clusters 11, which is reduced by 2.5/4. An area of the light-transmissive area is 1.5/4 of the first display area 10.

On the basis of FIG. 9, the sub-pixels in the first pixel cluster 11 may be arranged along the second direction Y. Details of specific embodiments are not repeated herein.

On the basis of FIG. 9, the sub-pixels of the first repeating sub-area 12 can be reduced to 1.5/9, etc. according to the above-described rules. Details of specific embodiments are not repeated herein.

In the following embodiments, the present disclosure is described using the standard RGB arrangement as an example of the pixel arrangement type of the first display area 10.

Figure 10:
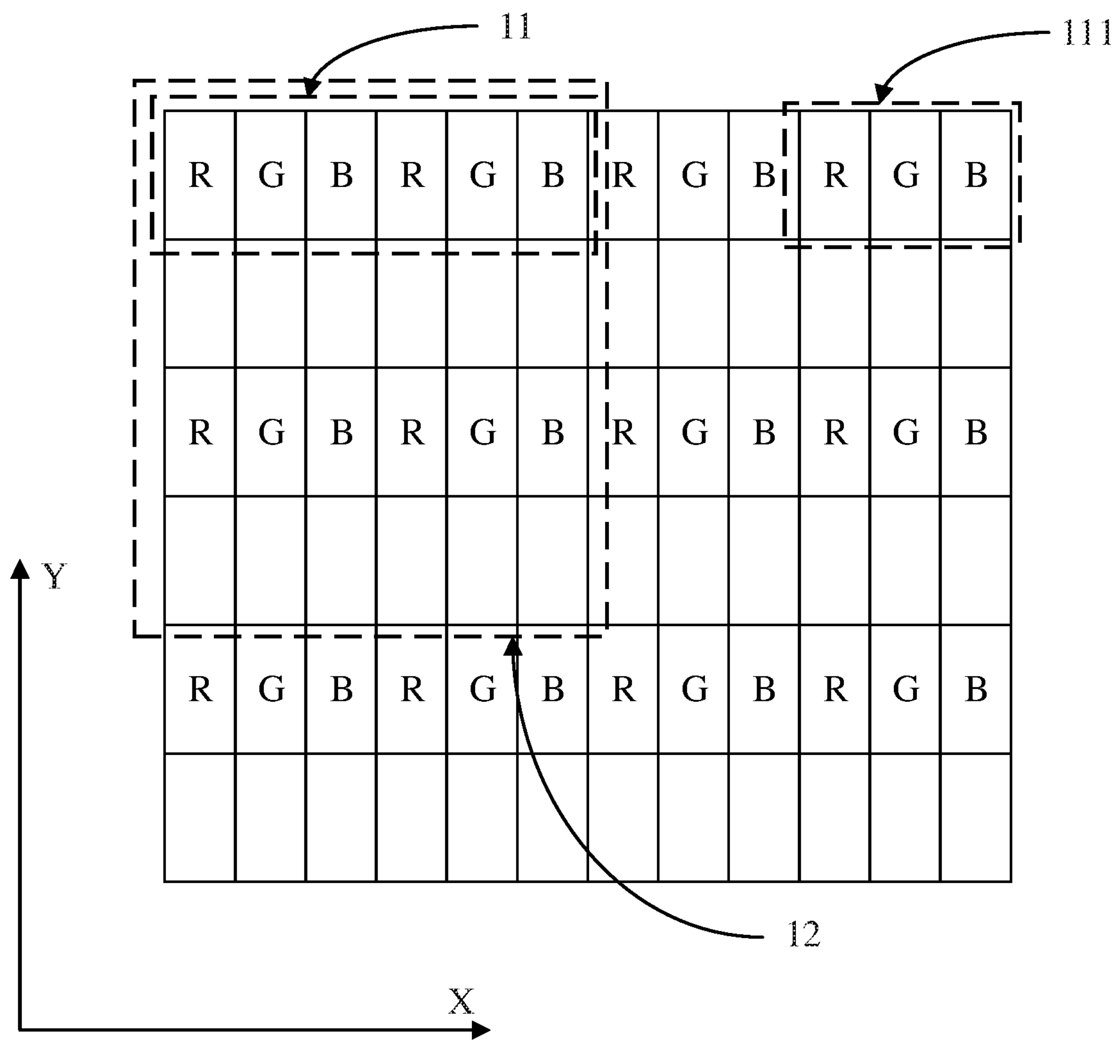
FIG. 10 is a structural view of a seventh pixel of the first display area of the display panel of the present disclosure.

Please refer to FIG. 10, the 12×12 pixel section is provided with six of the first pixel clusters 11. The first pixel clusters 11 are arranged along a first direction X and a second direction Y.

The two adjacent first pixel clusters 11 are disposed in close proximity in the first direction X.

A distance between the two adjacent first pixel clusters 11 in the second direction Y is a size of one of the sub-pixels in the second direction Y.

In the present embodiment, the first pixel cluster 11 includes two of the first sub-pixel clusters 111. Any one of the first sub-pixel clusters 111 is composed of one red sub-pixel, one green sub-pixel, and one blue sub-pixel. The first sub-pixel cluster 111 is arranged in an order of red sub-pixels, green sub-pixels, and blue sub-pixels in the first direction X.

The two adjacent first sub-pixel clusters 111 are disposed in close proximity in the first direction X.

A distance of the two adjacent first sub-pixel clusters 111 of the second direction Y is a size of one of the sub-pixels in the second direction Y.

Figure 11:
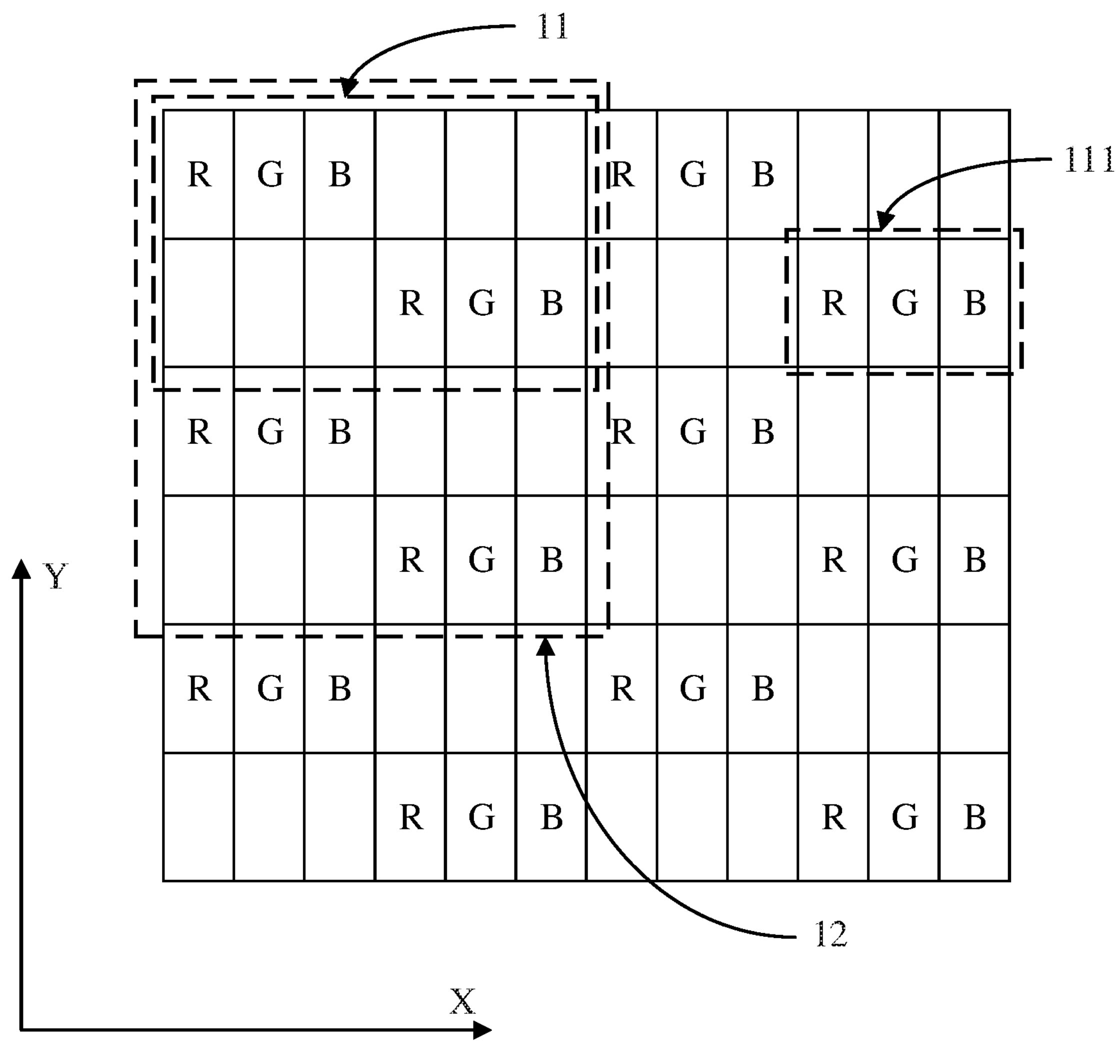
FIG. 11 is a structural view of an eighth pixel of the first display area of the display panel of the present disclosure.

Please refer to FIG. 11. FIG. 11 is same as or similar to FIG. 10, except that:

the 12×12 pixel section is provided with six of the first pixel clusters 11. The first pixel clusters 11 are arranged in a first direction X and a second direction Y.

A distance between the two adjacent first pixel clusters 11 in the first direction X is a size of three of the sub-pixels in the first direction X.

A distance between the two adjacent first pixel clusters 11 in the second direction Y is a size of one of the sub-pixels in the second direction Y.

In the present embodiment, the first pixel cluster 11 includes two of the first sub-pixel clusters 111. Any one of the first sub-pixel clusters 111 is composed of one red sub-pixel, one green sub-pixel, and one blue sub-pixel. The first sub-pixel cluster 111 is arranged in an order of red sub-pixels, green sub-pixels, and blue sub-pixels in the first direction X.

A distance between the two adjacent first sub-pixel clusters 111 in the first direction X is a size of three sub-pixels in the first direction X.

A distance between the two adjacent first sub-pixel clusters 111 in the second direction Y is a size of one of the sub-pixels in the second direction Y.

Figure 12:
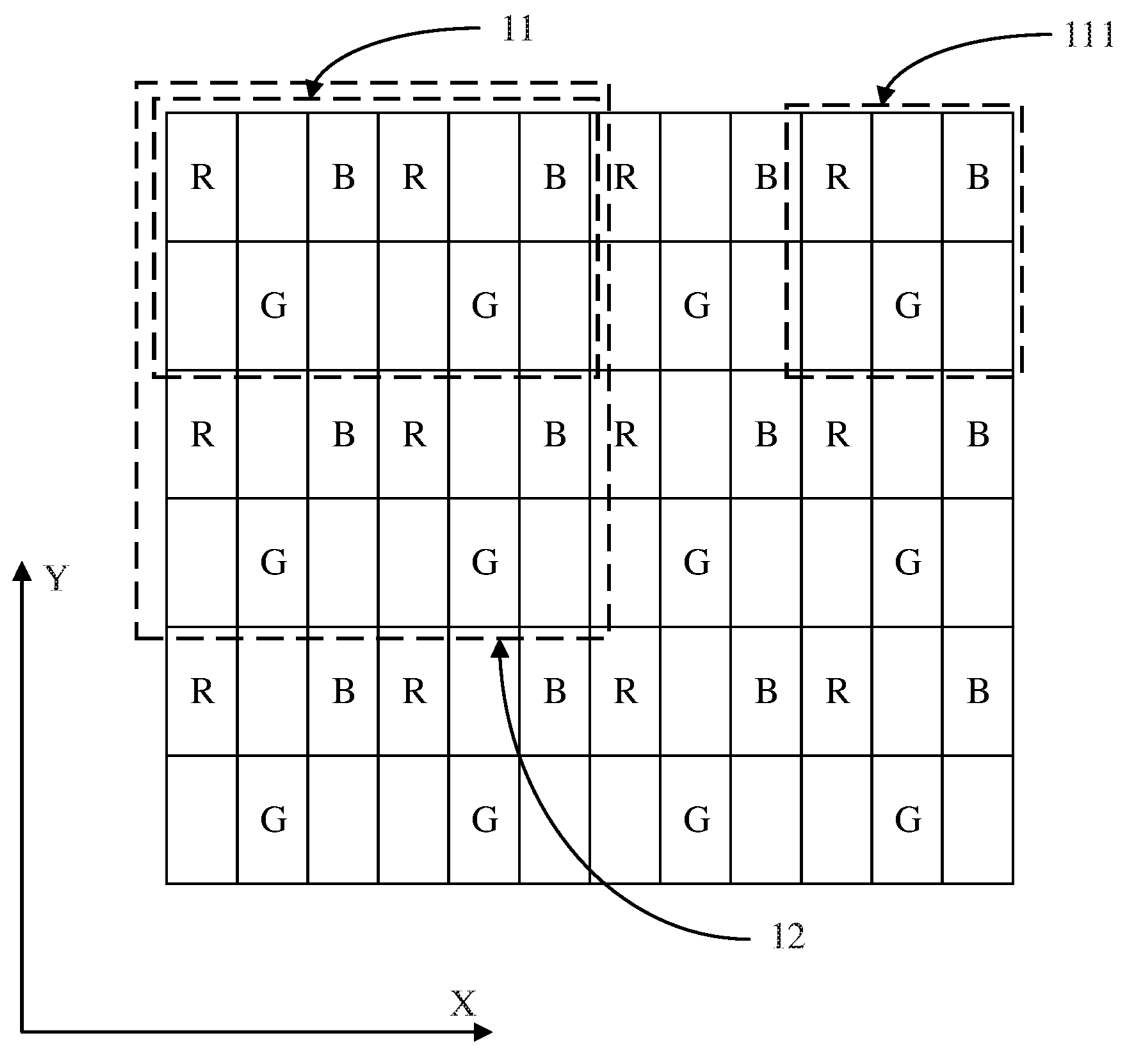
FIG. 12 is a structural view of a ninth pixel of the first display area of the display panel of the present disclosure.

Please refer to FIG. 12, which is same as or similar to FIG. 10, except that:

the red sub-pixel, the green sub-pixel, and the blue sub-pixel of the present embodiment are arranged in the form of a triangle within the first pixel cluster 11.

Compared with FIG. 10 and FIG. 11, the sub-pixels of the first display area 10 of FIG. 12 are relatively evenly distributed. While ensuring the camera module to receive an external light source, the first display area 10 has a better display performance in a display state.

Compared with the second display area 20, the first repeating sub-area 12 of FIGS. 10-12 is provided with four first pixel clusters 11, which is reduced by ½. An area of the light-transmissive area is ½ of an area of the first display area 10. External light enters the display panel 200 through an area where no sub-pixels are disposed and the external light is received by the corresponding camera module to achieve the imaging function.

On the basis of FIG. 10 to FIG. 12, the sub-pixels of the first repeating sub-area 12 can be reduced to ⅓, ¼, ⅙, etc. according to the above-described rule. Details of specific embodiments are not repeated herein.

In the form of the pentile arrangement for pixels, sub-pixels are required to share with each other in order to achieve a better display effect. However, deletion of the sub-pixels causes that the adjacent sub-pixels cannot be shared. Therefore, compared with the pentile pixel arrangement, when the form of the arrangement of the sub-pixels disposed within the first display area 10 is the standard RGB arrangement, display performance is better.

Because the sub-pixels of the second display area 20 are not deleted, PPI of the area is higher and picture quality is clearer. When deletion of the sub-pixels of the first display area 10 is high, the sub-pixel distribution density is reduced from the second display area 20 to the first display area 10, the image is blurred, and product quality is reduced. Therefore, the present disclosure provides a transition area 13 within the first display area 10 adjacent to the second display area 20.

Figure 13:
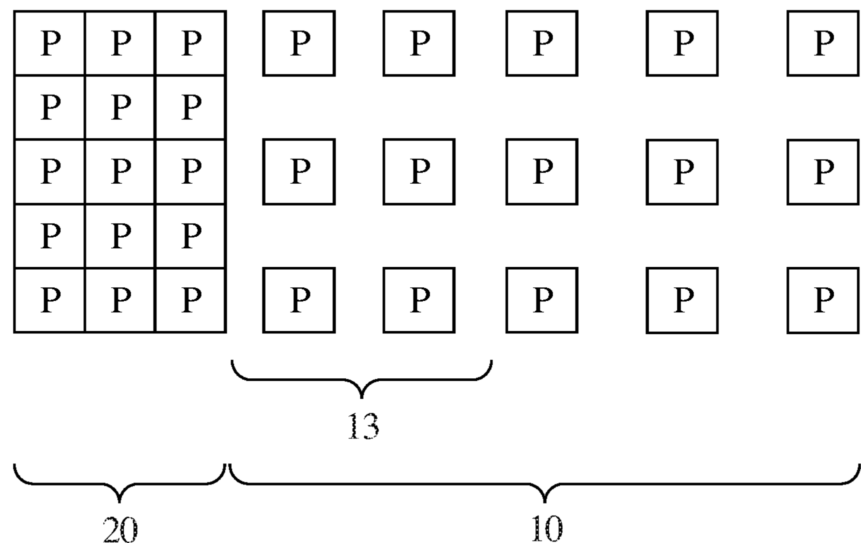
FIG. 13 is a structural view of a tenth pixel of the first display area of the display panel of the present disclosure.

Please refer to FIG. 13, in a direction of the second display area 20 to the first display area 10, a distance between the two adjacent first pixel clusters 11 or the adjacent first sub-pixel clusters within the transition area 13 is gradually increased.

In the transition region 13, a maximum distance between the two adjacent first pixel clusters 11 is less than or equal to a distance between two adjacent first pixel clusters 11 positioned in the central region of the first display region 10. A minimum distance between the two adjacent first pixel clusters 11 is greater than or equal to a distance between two adjacent second pixel clusters positioned within the second display region 20.

In the present embodiment, a shape of the first display area 10 can include at least one of a circle, a triangle, a square, or a rhombus. When a plurality of the first display areas 10 are provided, the shapes of the first display areas 10 may be a combination of some of the above-described shapes, which is not specifically limited in the present disclosure.

In the present embodiment, because light-emitting areas of different colors of sub-pixels are different, in order to provide brief description of the present disclosure, an area of the sub-pixels of the present disclosure is surrounded by the two adjacent data lines and the two adjacent scan lines, i.e., the area of any sub-pixel is the same.

The present disclosure increases the distance between the two adjacent first pixel clusters of the first display area in the first direction and/or the second direction, so that a sufficient light-transmissive area is left between two of the adjacent first pixel clusters 11. Light passes through the light-transmissive area to enter the camera module and is absorbed by the light-receiving device in the camera module to enable imaging function. The display panel 200 of the present disclosure achieves an imaging function while ensuring the area 10 to display properly, thereby increasing screen-to-body ratio of products and user experiences.

Figure 14:
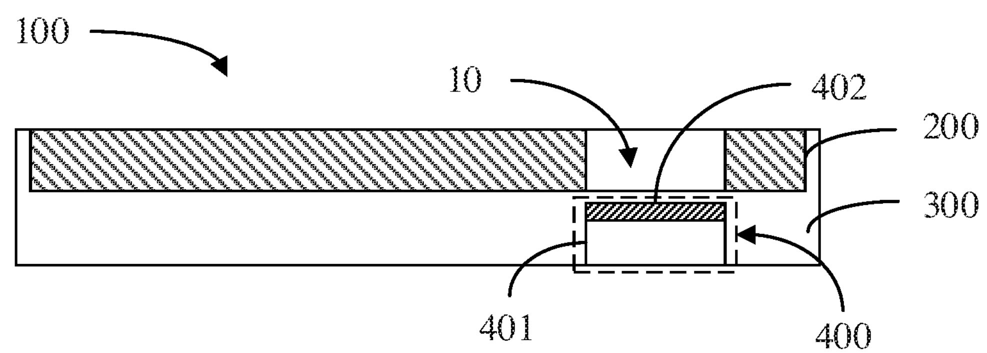
FIG. 14 is a cross-sectional view of the display device of the present disclosure.

Please refer to FIG. 14, the present disclosure further provides a display device 100, including the above-described display panel 200, a housing 300, and a camera module 400 disposed between the display panel 200 and the housing.

In the present embodiment, the camera module 400 can include a camera.

The camera includes at least one light-receiving device 401.

One of the light-receiving devices 401 corresponds to one of the first display areas 10. For example, a number of the corresponding light-receiving devices 401 is one.

The light-receiving device 401 of the present disclosure is mainly configured to receive external light that enters from the first display area 10, to convert the received external light into a corresponding optical signal, and to transmit the external light to the camera module 400.

In the present embodiment, an orthographic projection of the light-receiving device 401 on the display panel 200 covers the first display area 10.

In the present embodiment, the light-receiving device 401 further includes at least one light-receiving unit.

One of the light-receiving units corresponds to a light-transmissive area surrounded by at least two of the first pixel clusters 11 or the first sub-pixel clusters 111.

For example, in the above-described FIGS. 4-12, a transparent region between two adjacent first pixel clusters 11 or the first sub-pixel clusters 111 can be provided with one of the light-receiving unit. Any one of the light-receiving units transmits the received optical signal to the camera module 400 for imaging.

Please refer to FIG. 14, the camera module 400 further includes a switchable plate 402.

In the present embodiment, a surface of the switchable plate 402 adjacent to the display panel 200 is made of a reflective material. The present disclosure can reflect the light that enters the first display area 10 through the switchable plate 402.

In the present embodiment, when the camera module 400 is in operation, the switchable plate 402 of the camera module 400 is opened and the first display area 10 is in a non-display state. External light can pass through the transparent area of the first display area 10 and the external light is received by the light-receiving device 401 to output a corresponding optical signal. The camera module 400 receives the optical signal emitted by the light-receiving device 401 and forms an image.

When the camera module 400 is in a non-operating state, the switchable plate 402 of the camera module 400 is closed and the first display area 10 is in a display state. External light passes through the transparent area of the first display area 10. When the external light enters into the display panel 200, the switchable plate 402 reflects the corresponding light to external, which not only increases brightness of the pixels in the first display area 10, but also prevents the camera module 400 from being damaged by external light. In addition, the light emitted by the sub-pixels positioned in the first display area 10 can also be reflected to external through the switchable plate 402.

The present disclosure provides a display device and a driving method thereof. The display device includes a display panel, a housing, and a camera module disposed between the display panel and the housing. The display panel includes a first display area and a second display area. An orthographic projection of the camera module on the display panel is located within the first display area. Film structures of the first display area is made of a transparent material. The first display area corresponding to the camera module in the display panel is set as a controllable area. When the camera module is in operation, the first display area is transparent. When the camera module is turned off, the first display area performs normal image display, thereby increasing a screen-to-body ratio of the display device.

In summary, although the present disclosure has been described with preferred embodiments thereof, the above preferred embodiments is not used to limit the present disclosure. One of ordinarily skill in the art can carry out changes and modifications to the described embodiment without departing from the scope and the spirit of the disclosure that is intended to be limited only by the appended claims.

The invention claimed is:

1. A display panel, comprising: at least one first display area, and a second display area positioned at a periphery of the first display area;

wherein the first display area comprises a plurality of first repeating sub-areas repeatedly arranged in a first direction and a second direction, a difference between a size of the first repeating sub-areas in the first direction and a size of the first repeating sub-areas in the second direction is less than or equal to a size of one pixel, and the first direction is different from the second direction;

wherein the second display area comprises a plurality of second repeating sub-areas that has a same size as the first repeating sub-areas; and wherein a number of the pixels disposed within the first repeating sub-areas is less than a number of the pixels disposed within the second repeating sub-areas.

2. The display panel according to claim 1, wherein each of the first repeating sub-areas is provided with at least one first pixel cluster or one sub-pixel;

wherein the first pixel cluster comprises a plurality of the sub-pixels arranged in a predetermined arrangement order; and wherein the sub-pixels comprise any one of R, G, and B.

3. The display panel according to claim 2, wherein the first pixel cluster comprises any one of RGBG, RGBGBGRG, RGB, and BGR.

4. The display panel according to claim 2, wherein the first pixel cluster comprises a plurality of first sub-pixel clusters arranged in the first direction and/or the second direction; and wherein the first sub-pixel clusters each comprises at least one of R, G, and B.

5. The display panel according to claim 4, wherein two of the adjacent first sub-pixel clusters are disposed in close proximity in the first direction and/or the second direction; or a distance between the two adjacent first sub-pixel clusters in the first direction and/or between the two adjacent first sub-pixel clusters in the second direction is equal to a size of at least one of the sub-pixels in the first direction or the second direction.

6. The display panel according to claim 5, wherein each of the first repeat sub-areas is provided with five of the first pixel clusters;

wherein a distance between the two adjacent first pixel clusters in the first direction is a size of four of the sub-pixels in the first direction; and a distance between the two adjacent first pixel clusters in the second direction is a size of four of the sub-pixels in the second direction; and wherein the first pixel cluster comprises four of the first sub-pixel clusters, and the first sub-pixel cluster is composed of one red sub-pixel and one green sub-pixel, or composed of one blue sub-pixel and one green sub-pixel.

7. The display panel according to claim 5, wherein each of the first repeating sub-areas is provided with two of the first pixel clusters;

wherein any one of the first pixel clusters comprises two of the first sub-pixel clusters arranged along the first direction or the second direction; and wherein one of the first sub-pixel clusters is composed of one red sub-pixel and one green sub-pixel, and the another first sub-pixel cluster is composed of one blue sub-pixel and one green sub-pixel.

8. The display panel according to claim 5, wherein each of the first repeating sub-areas is provided with two of the first pixel clusters;

wherein any one of the first pixel clusters comprises four of the first sub-pixel clusters;

wherein one of the first sub-pixel cluster is composed of one red sub-pixel, the another first sub-pixel cluster is composed of one blue sub-pixel, and the other two of the first sub-pixel clusters are composed of one green sub-pixel; and wherein a distance between the two adjacent first sub-pixel clusters within the first pixel cluster in the first direction is equal to a size of one of the sub-pixels in the first direction.

9. The display panel according to claim 5, wherein each of the first repeating sub-areas is provided with one of the first pixel cluster;

wherein the first pixel clusters each comprises one of the first sub-pixel cluster;

wherein the first sub-pixel cluster is composed of one red sub-pixel, one blue sub-pixel, and one green sub-pixel; and wherein a distance between two adjacent first pixel clusters is equal to a size of one of the sub-pixels in the first direction.

10. The display panel according to claim 5,
wherein each of the first repeat sub-areas is provided with six of the first pixel clusters;
wherein the two adjacent first pixel clusters are disposed in close proximity in the first direction;
wherein a distance between two adjacent first pixel clusters in the second direction is a size of one of the sub-pixels in the second direction;
wherein the first pixel cluster comprises two of the first sub-pixel clusters;
wherein any one of the first sub-pixel clusters is composed of one red sub-pixel, one green sub-pixel, and one blue sub-pixel; and
wherein the first sub-pixel clusters are arranged in an order of red sub-pixels, green sub-pixels, and blue sub-pixels in the first direction.

11. The display panel according to claim 1, wherein a pixel arrangement type of the first display area is same as a pixel arrangement type of the second display area.

12. The display panel according to claim 11, wherein a ratio of the number of the pixels of the first repeating sub-areas to the number of the pixels of the second repeating sub-areas is any one of 1/2, 1/4, and 1/9.

13. The display panel according to claim 1, wherein a pixel arrangement type of the first display area is different from a pixel arrangement type of the second display area.

14. The display panel according to claim 13, wherein a ratio of the number of pixels of the first repeating sub-areas to the number of the pixels of the second repeating sub-areas is any one of 1.5/4 and 1.5/9.

15. A display device, comprising: a display panel, a housing, and a camera module disposed between the display panel and the housing;
wherein the display panel comprises at least one first display area, and a second display area positioned at a periphery of the first display area;
wherein the first display area comprises a plurality of first repeating sub-areas repeatedly arranged in a first direction and a second direction, a difference between a size of the first repeating sub-areas in the first direction and a size of the first repeating sub-areas in the second direction is less than or equal to a size of one pixel, and the first direction is different from the second direction;
wherein the second display area comprises a plurality of second repeating sub-areas that has a same size as the first repeating sub-areas; and
wherein a number of the pixels disposed within the first repeating sub-areas is less than a number of the pixels disposed within the second repeating sub-areas.

16. The display device according to claim 15, wherein each of the first repeating sub-areas is provided with at least one first pixel cluster or one sub-pixel;
wherein the first pixel cluster comprises a plurality of the sub-pixels arranged in a predetermined arrangement order; and
wherein the sub-pixel comprises any one of R, G, and B.

17. The display device according to claim 15, wherein the first pixel cluster comprises any one of RGBG, RGBGBGRG, RGB, BGR; or
wherein the first pixel cluster comprises a plurality of first sub-pixel clusters arranged in the first direction and/or the second direction;
wherein the first sub-pixel cluster each comprises at least one of R, G, and B.

18. The display device according to claim 15,
wherein the camera module comprises at least one light-receiving device; and
wherein one of the light-receiving devices corresponds to one of the first display areas.

19. The display device according to claim 18,
wherein the light-receiving device further comprises at least one light-receiving unit; and
wherein one of the light-receiving unit corresponds to a light-transmissive area that is surrounded by at least two of the adjacent first pixel clusters or the first sub-pixel clusters.

20. The display device according to claim 18,
wherein the camera module further comprises a switchable plate on the light-receiving device;
wherein a surface of the switchable plate adjacent to the display panel is composed of a reflective material;
wherein when the camera module receives the imaging signal sent by the display device, the switchable plate is opened, the first display area is in a non-display state, and the first display area permits an ambient light to incident on the camera module from the first display area; and
wherein when the camera module receives a display signal from the display device, the switchable plate is closed, the first display area is in a display state, and the switchable plate reflects the light emitted by the first display area to external.

* * * * *